United States Patent [19]
Andersson et al.

[11] Patent Number: 4,632,759
[45] Date of Patent: Dec. 30, 1986

[54] WASTEWATER TREATMENT METHOD

[75] Inventors: Per-Erik Andersson, Sundsvall; Thomas G. Welander, Malmö, both of Sweden

[73] Assignee: Purac Aktiebolag, Lund, Sweden

[21] Appl. No.: 717,871

[22] Filed: Mar. 29, 1985

[30] Foreign Application Priority Data

Apr. 11, 1984 [SE] Sweden .............................. 8402017

[51] Int. Cl.[4] ............................ C02F 3/28; C12P 5/02
[52] U.S. Cl. .................................... 210/603; 210/631; 210/928; 435/167; 48/197 A
[58] Field of Search ....................... 210/603, 631, 928; 435/167, 801; 48/197 A

[56] References Cited

U.S. PATENT DOCUMENTS 4,172,785 10/1979 Knoorre et al. .................. 210/96.1
4,200,523 4/1980 Balmat ................................ 210/631
4,415,453 11/1983 Witt et al. .......................... 210/631

FOREIGN PATENT DOCUMENTS 2648892 1/1978 Fed. Rep. of Germany.
2253661 5/1983 Fed. Rep. of Germany.
57-136996 8/1982 Japan .................................. 210/631
57-167795 10/1982 Japan .................................. 210/603
59-19590 2/1984 Japan .................................. 210/603
60-25594 2/1985 Japan .................................. 210/631

*Primary Examiner*—Benoit Castel
*Attorney, Agent, or Firm*—Burns, Doane, Swecker & Mathis

[57] ABSTRACT

At anaerobic treatment of wastewater it was found that resin and fatty acids in the wastewater have a toxic effect on the bacteria culture. According to the invention, this is solved by additions of iron or aluminium and calcium or magnesium.

10 Claims, 1 Drawing Figure

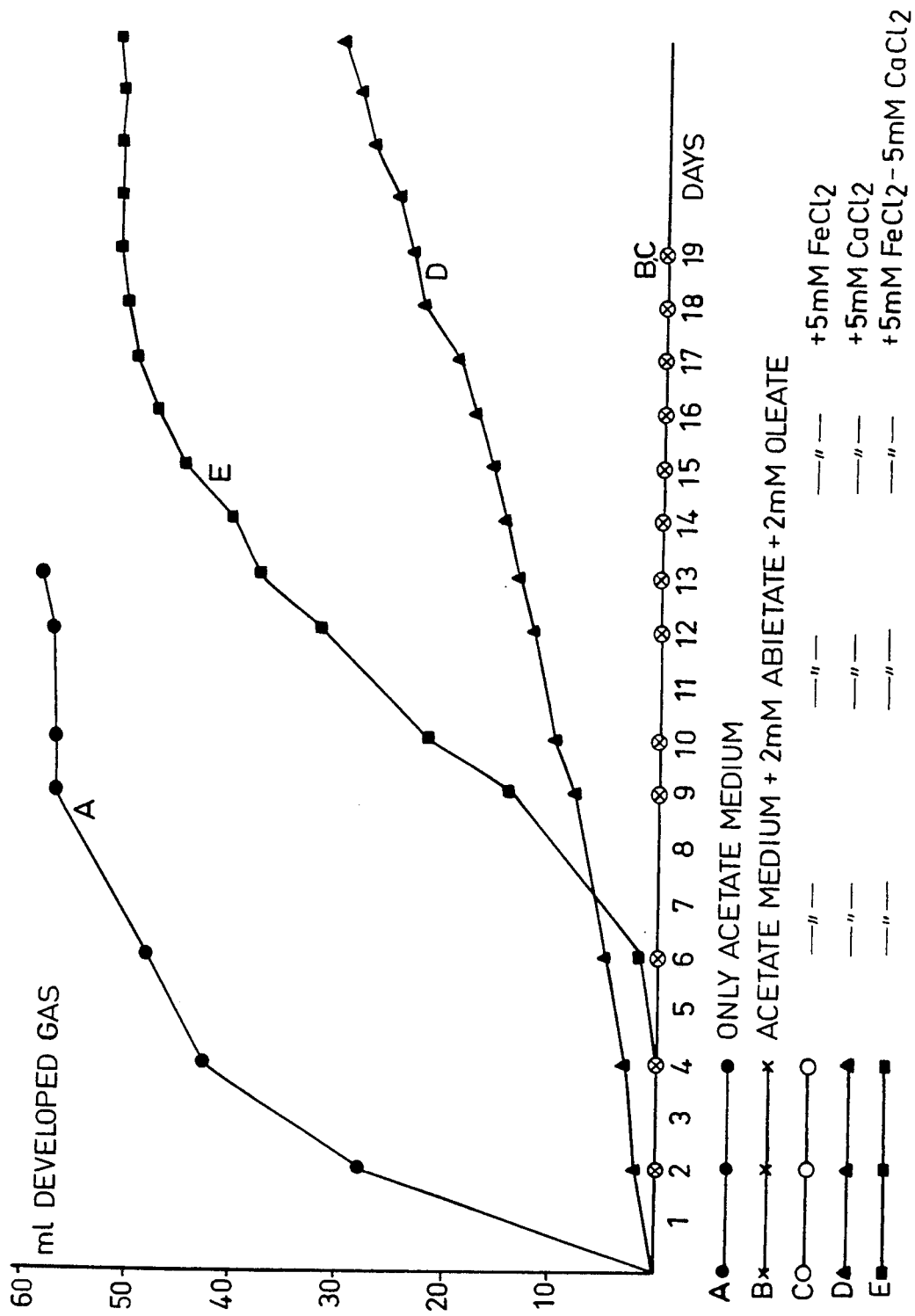

WASTEWATER TREATMENT METHOD

BACKGROUND OF THE INVENTION

At the manufacture of cellulose pulp from wood, for example at the manufacture of mechanical or chemi-mechanical pulp, a part or the main part of the resin acids and higher fatty acids of the wood, depending on the process conditions, are solved or dispersed.

These resin acids and fatty acids and the sodium salts thereof have proved at experiments with anaerobic treatment of the wastewater to be toxic toward methane bacteria. Tests, on which the present invention is based, have shown that it is possible by means of additives to inhibit these toxic effects.

SUMMARY OF THE INVENTION

It is found, thus, that an addition of metal salts containing iron or aluminium, or a mixture of metal salts containing these cations together with an addition of metal salts containing calcium or magnesium or a mixture of these salts, entirely or substantially entirely remove the toxic effect of said resin and fatty acids or the salts thereof. It also was found, that this effect was synergistic.

The addition alone of iron and/or aluminium salts has no effect on the toxicity. The addition alone of calcium and/or magnesium salts has a very limited effect on the toxicity of the wastewater.

The invention is illustrated in greater detail in the following with reference to an example thereof and to the accompanying drawing.

DESCRIPTION OF THE DRAWING

The FIGURE is a series of curves showing gas development versus time.

DESCRIPTION OF THE PREFERRED EMBODIMENT

At runs with methane fermentation on a laboratory scale the amount of methane gas was studied which developed when a certain amount of methane bacteria culture was added to a certain amount of solution containing a defined amount of acetate and a certain amount of nutrition solution. The methane gas development was studied during a number of days. The resulting methane gas development is shown in the accompanying FIGURE, curve A.

At another run, the same solution was mixed with a dispersion of sodium abietate and sodium oleate so that the concentration of sodium abietate and sodium oleate amounted each to 2 mM/liter in the solution. As appears from the FIGURE, during the 19 days duration of the experiment no methane gas developed. This mixture of Na-abietate and Na-oleate completely suppresses the activity of the methane bacteria.

At another run it was studied whether the addition of iron salts, $FeCl_2$, in a concentration corresponding to 5 mM offsets the suppressing effect of Na-abietate and Na-oleate. The results prove that iron salts do not have this effect.

When at still another run the solution containing methane culture, nutrition solution, acetate and the dispersion of Na-abietate and Na-oleate was mixed with a calcium salt, $CaCl_2$, the curve D in the FIGURE was obtained. The calcium salts partially counteract the inhibiting capacity of the abietate and oleate and a certain methane gas activity is obtained.

Still another run was carried out. To the mixture containing acetate solution, methane culture, nitrition solution and the abietate-oleate dispersion iron salts and calcium salts were added, so that the concentration as shown in the FIGURE was obtained. After several days incubation time the same methane activity as at the reference experiment A was obtained. It was found, that a simultaneous addition of iron and calcium salts has a synergistic effect when water containing abietate and oleate is added.

Continued runs proved that iron salts could be replaced by aluminium salts, whereby the same effect was obtained. The same result was obtained when the calcium salts were replaced by magnesium salts.

Continued studies showed that these effects were obtained at the addition of calcium salts in such an amount, that the mole ratio between calcium and the total of abietate and oleate amounted to 0.5–10, preferably 0.5–2. The same result was obtained when the calcium salt was replaced by a magnesium salt.

Within this optimum mole ratio for calcium or magnesium salts it was found, that the amount of iron or aluminium salts should be corresponding to the mole ratio 0.3–2.0 calculated as the mole ratio iron salt alternatively aluminium salt relative to the total of abietate and oleate.

The invention is not restricted to the embodiment described, but can be varied within the scope of the spirit of the invention idea.

We claim:

1. A method of treating wastewater containing resin acids and/or fatty acids or sodium salts of these acids from the manufacture of cellulose pulp comprising the steps of (i) anaerobically treating said wastewater in at least one methane fermentation step and (ii) adding to the wastewater metal salts which contain at least one cation from the group iron and aluminum and also contain at least one cation from the group calcium and magnesium.

2. A method as defined in claim 1 wherein the mole ratio between the content of cations from the group iron and aluminum and the total content of anions of resin acids and fatty acids and their sodium salts after adding the metal salts is 0.3–2.0.

3. A method as defined in claim 1 wherein the mole ratio between the content of cations from the group calcium and magnesium and the total content of anions of resin acids and fatty acids and their sodium salts after adding the metal salts is 0.5–10.

4. A method as defined in claim 1, wherein the mole ratio between the content of cations from the group calcium and magnesium and the total content of anions of resin acids and fatty acids and their sodium salts after adding the metal salts is 0.5–2.

5. A method as defined in claim 1 wherein iron is added in the form of iron chloride or iron sulphate.

6. A method as defined in claim 1 wherein aluminum is added in the form of aluminum chloride or aluminum sulphate.

7. A method as defined in claim 1 wherein calcium is added in the form of calcium carbonate or calcium chloride.

8. A method as defined in claim 1 wherein magnesium is added in the form of magnesium carbonate or magnesium sulphate.

9. A method as defined in claim 1 wherein the metal salts are added to the wastewater prior to anaerobically treating the wastewater.

10. A method as defined in claim 1 wherein the metal salts are added to the step (i).

* * * * *